US012307429B2

(12) United States Patent
Eapen

(10) Patent No.: US 12,307,429 B2
(45) Date of Patent: May 20, 2025

(54) METHOD AND SYSTEM FOR DEPOSIT PROCESSING NOTIFICATION

(71) Applicant: Digital First Holdings LLC, Atlanta, GA (US)

(72) Inventor: Arun George Eapen, Kitchener (CA)

(73) Assignee: Digital First Holdings LLC, Atlanta, GA (US)

( * ) Notice: Subject to any disclaimer, the term of this patent is extended or adjusted under 35 U.S.C. 154(b) by 61 days.

(21) Appl. No.: 16/456,210

(22) Filed: Jun. 28, 2019

(65) Prior Publication Data

US 2020/0410467 A1 Dec. 31, 2020

(51) Int. Cl.
*G06Q 20/10* (2012.01)
*G06Q 20/20* (2012.01)
*G06Q 20/40* (2012.01)
*G06K 19/06* (2006.01)

(52) U.S. Cl.
CPC .......... *G06Q 20/108* (2013.01); *G06Q 20/40* (2013.01); *G06K 19/06187* (2013.01); *G06Q 20/1085* (2013.01); *G06Q 20/20* (2013.01)

(58) Field of Classification Search
CPC .................................................. G06Q 20/108
See application file for complete search history.

(56) References Cited

U.S. PATENT DOCUMENTS

| 7,481,360 | B1* | 1/2009 | Ramachandran | G06Q 20/18 |
| | | | | 235/379 |
| 2008/0086420 | A1* | 4/2008 | Gilder | G06Q 20/00 |
| 2011/0066529 | A1* | 3/2011 | Larsen | G06Q 40/02 |
| | | | | 705/30 |
| 2013/0028502 | A1* | 1/2013 | Nepomniachtchi | |
| | | | | G06Q 20/3276 |
| | | | | 382/137 |
| 2014/0236820 | A1* | 8/2014 | Carlton | G06Q 20/106 |
| 2015/0127533 | A1* | 5/2015 | Knebel | G06Q 20/042 |
| 2015/0178374 | A1* | 6/2015 | Rahat | G06F 21/316 |
| | | | | 707/740 |
| 2019/0043023 | A1* | 2/2019 | Kurian | G06Q 20/3823 |

FOREIGN PATENT DOCUMENTS

CA 2408078 * 9/2011 ........... G06Q 20/042

OTHER PUBLICATIONS

Mandal et al., in Design of Electronic Payment System Based on Authenticated Key Exchange, in Electronic Commerce Research, (2018) (Year: 2018).*

* cited by examiner

*Primary Examiner* — Olabode Akintola
*Assistant Examiner* — Brandon M Duck
(74) *Attorney, Agent, or Firm* — Schwegman Lundberg & Woessner, P.A.

(57) ABSTRACT

Identifying data associated with a deposit is linked to contact information associated with an issuer of the deposit. During deposit processing, the issuer is identified, and an out-of-band message is sent to a device operated by the issuer requesting that the deposit be validated or be declined. Responsive to an instruction received from the issuer, the deposit processing continues, or the deposit is declined and not further processed.

5 Claims, 4 Drawing Sheets

METHOD AND SYSTEM FOR DEPOSIT PROCESSING NOTIFICATION

BACKGROUND

Technology has permitted checks to be deposited through a variety of means, such as through a mobile banking application, at an Automated Teller Machine (ATM), at a bank teller terminal, and/or at a retail store through either a cashier-assisted terminal or a Self-Service Terminal (SST). Upon deposit the check image is electronically processed through a well-defined processing path for purposes of debiting an account that issued the check and crediting an account and/or providing funds represented in the check to the individual cashing the check.

The processing path includes interaction with different banking systems and a clearing house before it can be cleared or deposited into the depositor's account. The check issuer (account from which the funds are being debited) is completely unaware of when the check was cleared or when it was denied payment to the depositor.

The check issuer may also not timely become aware of when a check was fraudulently written against the issuer's account. As a result, fraudulent checks can be processed through the processing path and only subsequently discovered after the issuer's account is debited. Once discovered, the check depositor may be unreachable or even unknown. Depending on the circumstances, the issuer may sustain losses or one of the banks (bank where the check was initially deposited or bank of the issuer) may have to absorb any losses from the fraudulent check.

Banks plan for such losses and have attempted little to alter or change the well-established check processing path believing that doing so would be cost prohibitive and involve multiple different entities that must coordinate such changes with one another.

Additionally, even legitimately written checks can sometimes cause the issuer losses with the issuer's bank through overdraft fees. A depositor may not immediately cash a check from the issuer. As a result, the issuer may have forgotten to record the check and/or may have assumed that the depositor lost the check and is never going to deposit the check. Also, issuers may post-date checks in anticipation of receiving funds before the checks are deposited and when such funds fail to arrive in a timely manner, the issuer is in an overdraft situation. Moreover, many times the well-established check processing path does not detect post-dated checks, such that the checks are attempted to be processed upon deposit. Any of these circumstances can result in the issuer lacking enough funds to cover the check triggering overdraft fees with the issuer's bank.

The depositor can also sustain losses and/or inconveniences. For example, previously credit funds to the depositor's account may be rolled back by the depositor's bank, fees may be accessed to the depositor's account because of any bounced check, and any rolled back funds in the depositor's account may cause the depositor to be in an overdraft situation because funds the depositor believed to be in his/her account are no longer in the account. The depositor can also experience longer than expected delays in waiting for the deposited check to clear and be credited to the depositor's account.

SUMMARY

In various embodiments, methods and a system for deposit processing notification are provided.

According to one aspect, a method for deposit processing notification is presented. Identifying information for a deposit being processed for a depositor on a depositing device is obtained and a determination is made as to whether the identifying information is linked to an issuer of the deposit. Deposit details associated with the deposit are sent in a message to the issuer requesting authorization from the issuer to continue processing the deposit when the identifying information is linked to the issuer. Processing of the deposit is interrupted and terminated when a response from the issuer indicates that the deposit is unauthorized.

DETAILED DESCRIPTION

Figure 1:
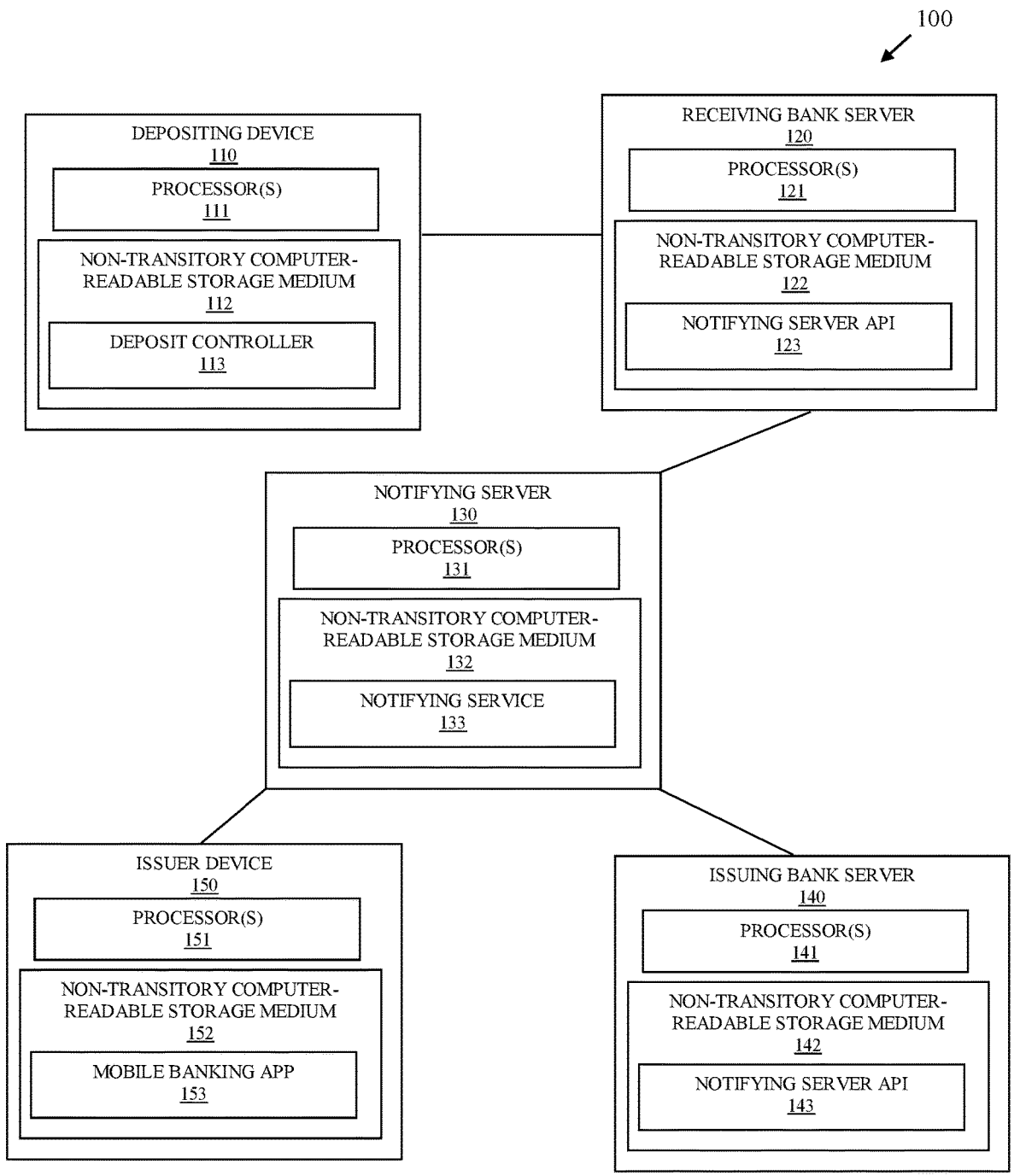
FIG. 1 is a diagram of a system for deposit processing notification, according to an example embodiment.

FIG. 1 is a diagram of a system 100 for deposit processing notification, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or with less components are possible without departing from the teachings of deposit processing notification, presented herein and below.

As used herein and below, the terms "issuer" refers to the individual or entity that wrote a negotiable instrument or was purported to have provided the negotiable instrument payable from an account owned by the issuer.

A "depositor" refers to the individual or entity that deposited or attempts to deposit a negotiable instrument provided by the issuer into an account held by the depositor.

An "issuing financial institution" refers to the bank or financial institution that administers and controls the issuer's account.

A "receiving or processing financial institution" refers to the bank or financial institution that administers or controls the depositor's account.

The system 100 includes a depositing device 110, a receiving back server 120, a notifying server 130, an issuing bank server 140, and an issuer device 150. Each of the devices 110—150 include: one or more processors (111, 121, 131, 141, and 152) and non-transitory computer readable storage media (112, 122, 131, 141, and 152) having executable instructions (113, 123, 133, 143, and 153). Executable instructions (113, 123, 133, 143, and 153) when executed by processors (111, 121, 131, 141, and 152) from non-transitory computer readable storage media (112, 122, 131, 141, and 152) cause processors (111, 121, 131, 141, and 152) to perform the processing discussed herein and below with respect to: deposit controller 113 for depositing device, notifying server Application Programming Interface (API) 123 for receiving bank server 120, notifying service 133 for notifying server 130, notifying server API 143 for receiving bank server 140, and mobile banking application (app) 153 for issuer device 150.

It is to be noted that the techniques presented herein do not require any substantial modifications or changes to the existing well-established check processing path for purposes of achieving the beneficial check notification and check verification discussed below. Thus, the teachings can be easily integrated into the existing check processing path for purposes of enhancing and improving that processing path.

For purposes of the discussion that follows a check is discussed but it is to be noted that any debit and credit of a negotiable instrument other than a conventional check may also benefit from the teachings presented here.

A depositor attempts to deposit a check that is purported to be written by or originating from an issuer's account. (Many banking services offer online and automated check writing services, such that as used herein "writing a check" includes any means by which checks are originated.) The check is deposited for processing at depositing device 110.

Depositing device 110 can include an ATM associated with receiving bank 120, a mobile phone or tablet operated by the depositor, a teller terminal, an SST terminal, and/or a Point-Of-Sale (POS) terminal operated by a cashier at a retail establishment. As used herein "depositing device 110" may also be referred to as "deposit transaction device 110."

The depositing device 110 identifies the Magnetic Ink Character Recognition (MICR) encoded line of the check. The MICR encoded line identifies the issuer's bank and the issuer's account number with that bank. Deposit controller 113 is an agent on deposit device 110 that listens for deposits being made and reports information about the check to receiving bank server 120. This information includes the MICR details and a bank, bank account of the depositor, an amount associated with the check, and date of the check. If depositing device 110 is a mobile device of the depositor, then a mobile device identifier may be reported as well.

Notifying server API 123 of receiving bank server 120 receives this information from deposit controller 113 and uses information contained in the MICR encoded information to determine: 1) whether the issuer associated with the issuer account is known; or 2) whether the transaction is "on-us" (meaning the check is presented is drawn and an issuer's account that is controlled by receiving bank 120—such that receiving bank 120 is able to directly clear the check on behalf of the depositor and issuer based on known funds in the issuer's account with receiving bank 120). If either of these conditions are identified, then the MICR encoded information or a hash of the MICR encoded information is sent from notifying server API to notifying service 133 of notifying server 130. A unique hashing algorithm may be used, such that information regarding the issuer is not exposed over any network transaction between receiving bank server 120 and notifying server 130. The notifying server API 123 may also send the amount of the check, a name of the depositor (if known), the date of the check, and a location associated with depositing device 110.

Notifying service 133 uses the hash or the issuer bank and issuer account information in the MICR encoded information to search an indexed data store for an electronic contact address or identifier associated with the issuer. The issuer has signed up, registered, and authorized linking the issuer's account to the electronic contract address.

Notifying service 133 uses the electronic contract address to send a real-time message to issuer device 150 operated by the issuer. This can be achieved in a variety of manners and dependent on the type of electronic contract address registered for the issuer. For example, the real-time message may be sent via a Short Message Service (SMS) text to the mobile identifier (e.g., phone number when the issuer device 150 is a phone), via an electronic mail (email) to an email address of the issuer, and/or via an in-app message sent to mobile banking app 153 (here notifying service 133 includes an API for interacting with mobile banking app 153). The real-time message asks the issuer to confirm or reject the check deposit that is being attempted by the depositor by providing the issuer with the name of the depositor (if known), amount of the check, date of the check, and a location associated with depositing device 110. In some cases, the real-time message may also include the time of day that the check was processed for deposit by deposit device 110.

The issuer responds by SMS text, email, or through mobile banking app 153 to confirm that the check should be paid or to identify the check as being fraudulent. This is received by notifying service 133 and communicated in real time to notifying server API 123 of receiving back server 120. Notifying server API 123 may then force an interrupt or an override that causes deposit controller 113 to notify depositor on depositor device 110 that the check will not be deposited or cashed when the issuer identified the check deposit as being fraudulent.

When issuer confirmed the deposit, no further action is needed, and the check continues to be processed through the clearing house (if needed, e.g., check was not an "on-us" deposit) for payment from issuing bank server 140 out of funds associated with the issuer's account with the issuing bank. That is, there is no interrupt into the check processing path when confirmed by the issuer.

In an embodiment, when the issuer registered bank account and electronic contact information with notifying server 130, the issuer may also set preferences in an associated profile. The preference may include a setting that indicates what is to happen by default if the issuer receives the real-time authorization request and does not respond within a configured amount of time. The issuer can by default authorize depositing and processing of the check when no response is received from the issuer within the configured amount of time or the issuer can by default force denial of the deposit when no response is received from the issuer within the configured amount of time. In an embodiment, an upward limit on the configured amount of time may be pre-set such that the issuer cannot set a period-of-time that prevents the depositor from reasonably know a status of the deposit when depositing device 110 is an ATM, POS terminal, or an SST.

If there is: 1) no issuer known to notifying service 133 when receiving the real-time MICR information from notifying server API 123 and 2) the check was not an "on-us" deposit (such that receiving bank 120 is also the issuing bank), the check deposit request continues through the check processing path and is passed to the check clearing house for delivery to the issuing bank of the issuer at issuing bank server 150.

When received at the issuing back server 150, notifying server API 143 obtains the check details for its issuer and the issuer's account along with the other relevant check details provided by the clearing house. Notifying server API contacts notifying service 133 and the real-time notification processing discussed above with receiving bank 120 is performed with issuer device 150 either through mobile banking app 153, SMS text, and/or email communications. If issuer had already authorized payment of the check with receiving bank 120 (as discussed above), notifying service 133 maintains a flag that it provides back to notifying API 143, and no action is taking with respect to getting real-time verification and notification from the issuer. This prevents an issuer from initially authorizing the check deposit and then later trying to repudiate payment of the check when received at issuing bank 140. However, a notification may still be sent to the issuer at this point indicating issuing bank has received the check and processed the payment accordingly.

It is to be noted as was discussed above, that receiving bank 120 and issuing bank 140 may be one and the same in situations where the check is drawn on the same bank that receives the check as a deposit.

In an embodiment, the deposit controller 113 is an enhanced version of a mobile banking app for either receiving bank 120 or issuing bank 140.

In an embodiment, deposit device is one of: an ATM, a teller terminal, a POS terminal, an SST, a phone, a tablet, and/or a wearable processing device.

In an embodiment, notifying server 130 is included within a processing environment associated with one or more of receiving bank server 120 and/or issuing bank server 140.

In an embodiment, notifying service 133 is provided form a cloud processing environment (for which notifying server 130 is a part of) as a subscription service to: receiving bank server 120, issuing bank server 140, and/or issuer.

As used herein "notifying server 130" may also be referred to as "validation server 130" or "notification server 130."

Moreover, "notifying service 133" may also be referred to as "validation service 133" or "notification service 133."

The above-referenced processing may also provide an ability for post-dated checks to be processed, by interactively asking the issuer if the post-dated check is accurate and authorized.

These and other embodiments will now be discussed with reference to FIGS. 2-4.

Figure 2:
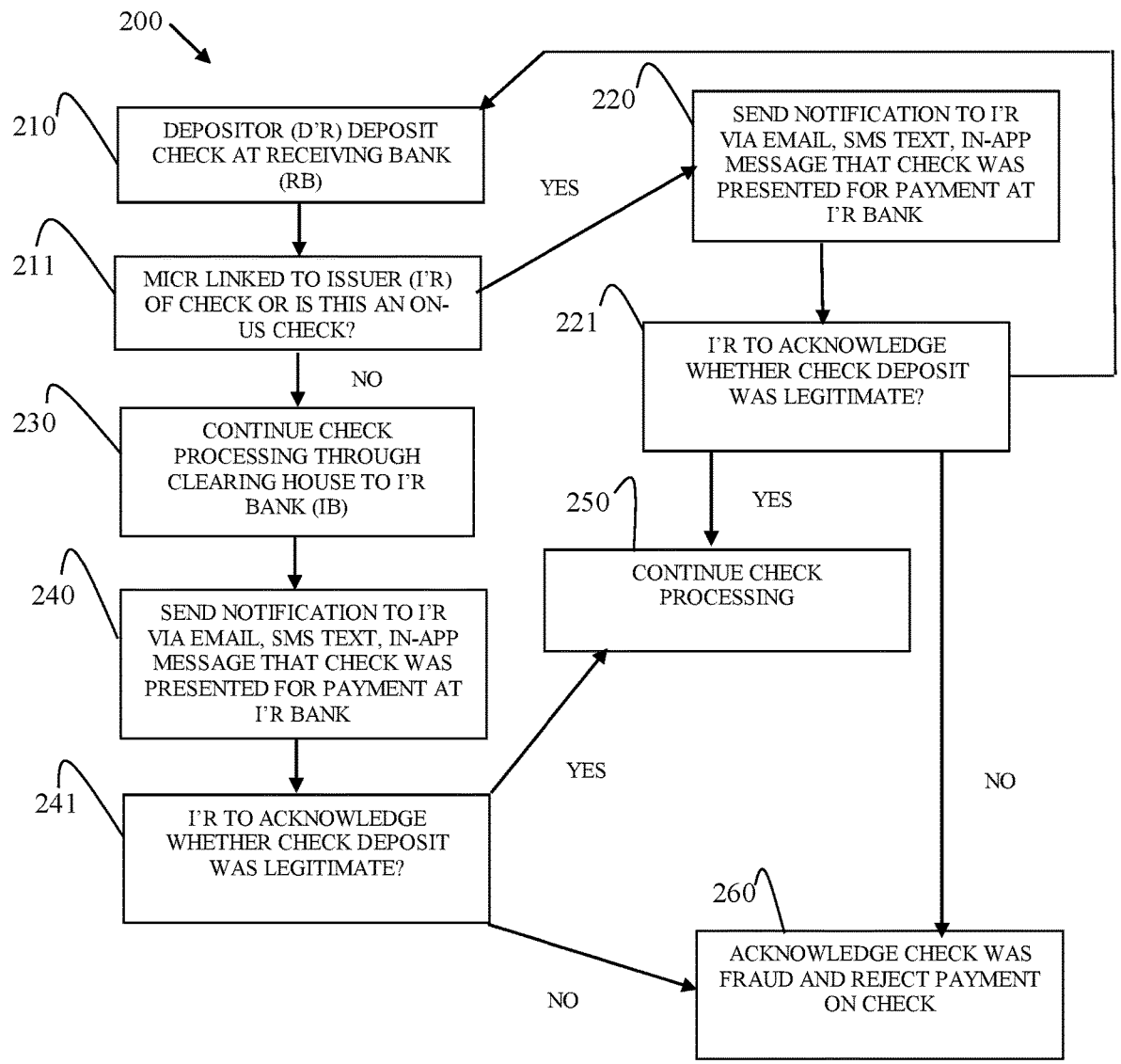
FIG. 2 is a diagram of a method for deposit processing notification, according to an example embodiment.

FIG. 2 is a diagram of a method 200 for deposit processing notification, according to an example embodiment. The method 200 is implemented as one or more software modules referred to herein collectively as "interactive-check-validator." The software modules are provided as executable instructions that reside in non-transitory computer-readable storage media and are executed by one or more hardware processors of one or more devices. The interactive-check-validator has access to one or more networks during processing which can be wired, wireless, or a combination of wired and wireless.

In an embodiment, the interactive-check-validator is all-of or some-combination of 113, 123, 133, 143, and/or 153.

At 210, the interactive-check-validator is triggered by depositing device 110 reporting a check deposit made by a depositor. That is, the processing of the interactive-check-validator starts upon detection of a deposit transaction that is initiated on the depositing device 110.

At 211, the interactive-check-validator inspects the MICR to a linked contact information associated with the issuer of the check or checks to see if the check is an "on-us" check/deposit being made (the check by the depositor is drawn on an account controlled by a same bank that is processing the deposit request from a depositor).

At 220, the interactive-check-validator sends a real-time and interactive notification and verification to the issuer device 150. The notification identifies the bank receiving the deposit for processing and may include other information or details as was discussed above.

At 221, the interactive-check-validator receives an acknowledgment that the check was legitimate or was fraudulent back from the issuer.

If an acknowledgment was received, the interactive-check-validator continues to process the check, at 250. If an indication was received at 221 that the check is not to be processed, then the interactive-check-validator flags the transaction and check and declines to continue processing the deposit at 260. Once completed, the interactive-check-validator loops back to 210 waiting for a next check deposit from depositing device 110.

If at 211, the interactive-check-validator determines that the check was not associated with a known issuer and that the check was not an "on-us" check, then the check is passed to a clearing house for continued check deposit processing at 230.

At 240, when the check is presented by the clearing house to the issuing bank, the interactive-check-validator sends a notification to the issuer requesting validation and approval to process payment from issuer's account to the depositor's account.

At 241, the interactive-check-validator inspects the response from the issuer and if the issuer approves or acknowledges the deposit, check processing continues at 250. If the issuer declines the check as being legitimate, the deposit request is denied, and processing stops at 260.

Figure 3:
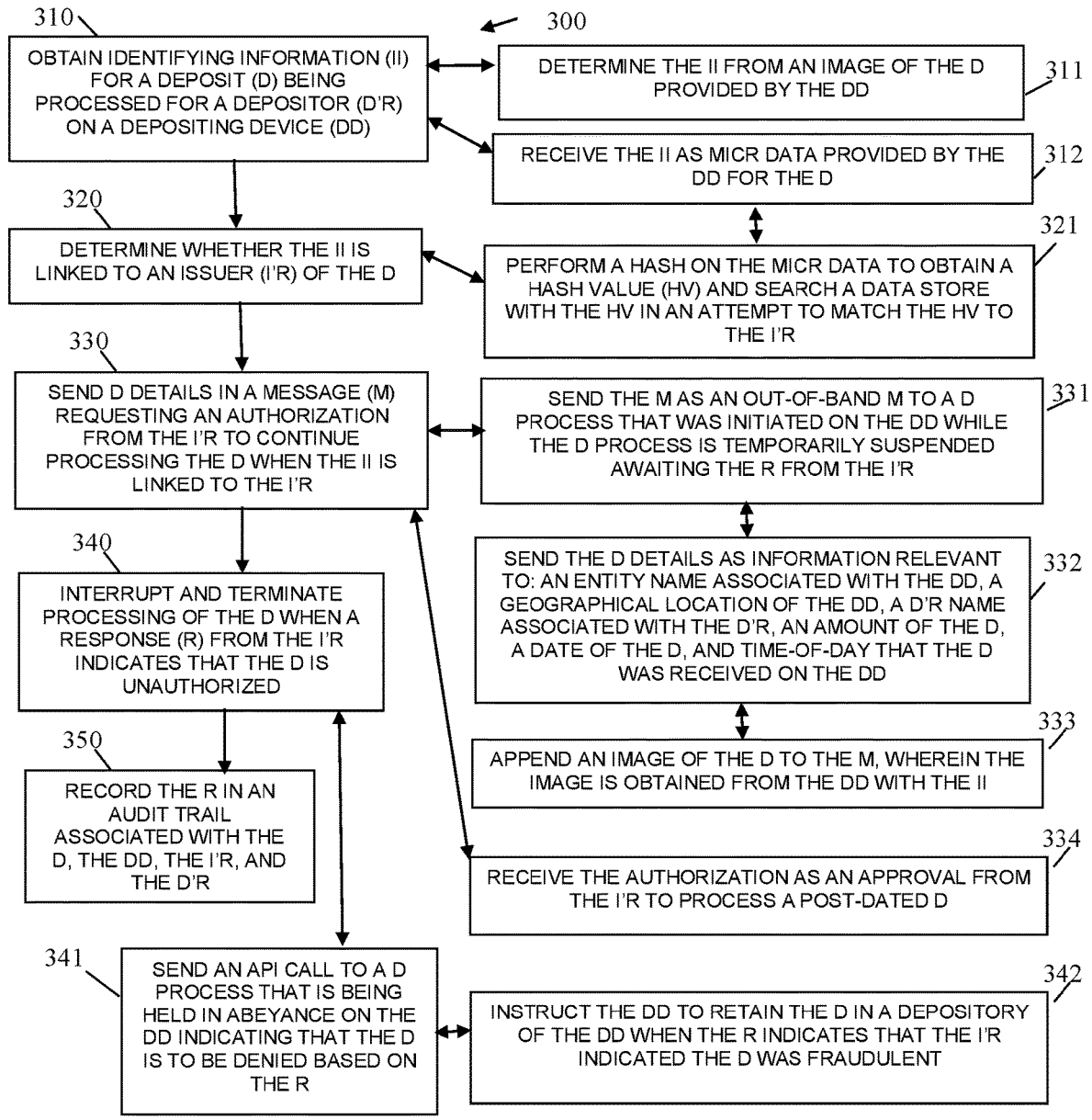
FIG. 3 is a diagram of another method for deposit processing notification, according to an example embodiment.

FIG. 3 is a diagram of a method 300 for deposit processing notification, according to an example embodiment. The software module(s) that implements the method 300 is referred to as a "deposit validator." The deposit validator is implemented as executable instructions programmed and residing within memory and/or a non-transitory computer-readable (processor-readable) storage medium and executed by one or more processors of a device. The processor(s) of the device that executes the deposit validator are specifically configured and programmed to process the deposit validator. The deposit validator has access to a network connection, any such network connection can be wired and/or wireless.

In an embodiment, the device that executes the deposit validator is the notifying server 130. In an embodiment, server 130 is part of a cloud processing environment.

In an embodiment, the device that executes the deposit validator is the receiving bank server 120 and/or the issuing bank server 140.

In an embodiment, the deposit validator performs the processing discussed above with the FIGS. 1 and/or 2.

The deposit validator represents another in some ways enhanced processing perspective from that which was discussed above with the method 200 of FIG. 2.

At 310, the deposit validator obtains identifying information for a deposit that is being processed for a depositor on a depositing device. The depositing device can be any of the above-referenced depositing devices 110. In an embodiment, the deposit is a check that is being deposited during a deposit transaction by the depositor on or at the depositing device 110.

In an embodiment, at 311, the deposit validator determines the identifying information from an image of the deposit provided by the depositing device. Image processing is performed on the face of the deposit to identify with the identifying information an account and bank associated with the deposit. Other information may be obtained as well including a name of the depositor, an amount of the deposit, a date that the deposit was written/created, etc.

In an embodiment, at 312, the deposit validator receives the identifying information as MICR data provided by the depositing device for the deposit.

At 320, the deposit validator determines whether the identifying information is linked to a registered issuer associated with the deposit that is being made at 310.

In an embodiment of 312 and 320, at 321, the deposit validator performs a hash on the MICR data to obtain a hash value. The deposit validator searches a data store with the hash value to match the hash value to an entry in the data store that includes electronic contract information for the issuer.

At 330, the deposit validator sends deposit details in a message. The message requests an authorization from the issuer to continue processing the deposit when the identifying information is linked to the issuer and was able to be determined at 320.

In an embodiment, at 331, the deposit validator sends the message as an out-of-band (OOB) relative to a deposit process that was initiated on the depositing device while the deposit process is temporarily suspended awaiting a response from the issuer.

In an embodiment of 331 and at 332, the deposit validator sends the deposit details as information relevant to: an entity name associated with the depositing device, a geographical location of the depositing device, a depositor name associated with the depositor, an amount of the deposit, a date that the deposit was written or created, and a time of day that the deposit was received on the depositing device.

In an embodiment of 332 and at 333, the deposit validator appends an image of the deposit to the message. The image is obtained from the depositing device with the identifying information.

In an embodiment, at 334, the deposit validator receives the authorization as an approval from the issuer to process a post-dated deposit. That is, the date that the deposit was purported to have been written or created is a date in the future and is after the date that the deposit was actually deposited on the depositing device. Here, the depositor may be attempting to cash the deposit before the date that the issuer intended for it to be cashed. The issuer is given the opportunity to approve or deny such a situation.

At 340, the deposit validator interrupts and terminates processing of the deposit when a response from the issuer indicates that the deposit is unauthorized.

In an embodiment, at 341, the deposit validator sends an API call to a deposit process that is being held in abeyance on the depositing device. The call indicating that the deposit is to be denied based on the response from the issuer.

In an embodiment of 341 and at 342, the deposit validator instructs the depositing device to retain the deposit in a depository of the depositing device when the response indicates that the issuer indicated the deposit is believed by the issuer to be fraudulent.

In an embodiment, at 350, the deposit validator records the response in an audit trail associated with the deposit, the depositing device, the issuer, and the depositor. A response that provided the authorization may be used as evidence of non-repudiation by the issuer should the issuer subsequent assert that the deposit is fraudulent and should not have been paid.

Figure 4:
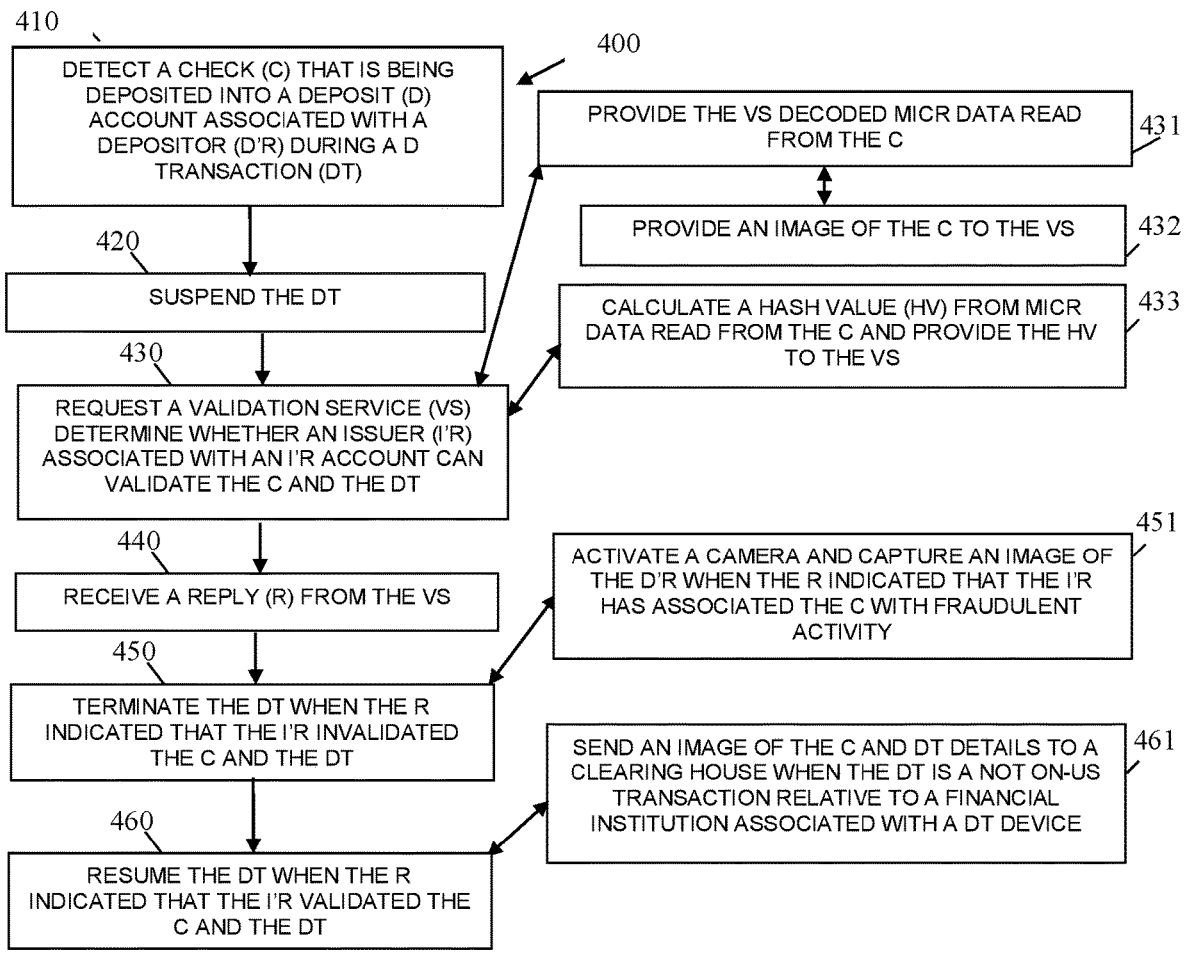
FIG. 4 is a diagram yet another method for deposit processing notification, according to an example embodiment.

FIG. 4 is a diagram of another method 400 deposit processing notification, according to an example embodiment. The software module(s) that implements the method 400 is referred to as a "deposit notifier/validator." The deposit notifier/validator is implemented as executable instructions programmed and residing within memory and/ or a non-transitory computer-readable (processor-readable) storage medium and executed by one or more processors of a device. The processors that execute the deposit notifier/ validator are specifically configured and programmed to process the deposit notifier/validator. The deposit notifier/ validator has access to one or more network connections during its processing. Any network connections can be wired, wireless, or a combination of wired and wireless.

In an embodiment, the device that execute the deposit notifier/validator is the depositing device 110. In an embodiment, the depositing device 110 is: an ATM, an SST, a POS terminal, a table, a wearable processing device, or a phone.

The method 300 discussed processing from the perspective of the notifying server 130 and the notifying service 133, the deposit notifier/validator of FIG. 4 represents processing from the perspective of the depositing device 110.

In an embodiment, deposit notifier/validator is all-of, or some-combination of: the processing discussed above with the FIGS. 1-3.

At 410, the deposit notifier/validator detects a check that is being deposited into a deposit account associated with a depositor during a deposit transaction.

At 420, the deposit notifier/validator suspends the deposit transaction and obtains information regarding the check, the depositing device, and/or the depositor.

At 430, the deposit notifier/validator requests that a validation service determine whether an issuer associated with an issuer account can validate the check and the deposit transaction. In an embodiment, the validation service is the notifying service 133 and/or the method 300 discussed above.

In an embodiment, at 431, the deposit notifier/validator provides the validation service decoded MICR data read from the check by the depositing device 110.

In an embodiment of 431 and at 432, the deposit notifier/ validator provides an image of the check to the validation service in addition to the MICR data read.

In an embodiment, at 433, the deposit notifier/validator calculates a hash value from the MICR data read from the check and provides the hash value to the validation service. This embodiment provides added security to both the issuer and the depositor my not exposing data relating to the check over any network connection between the depositing device and the notifying server 130, since a hash value is a form of encryption.

At 440, the deposit notifier/validator receives a reply back from the validation service. It is noted that the reply may indicate that the issuer is not known to the validation service (unregistered issuer) in which case processing of the check continues normally and resumes back on the depositing device.

At 450, the deposit notifier/validator terminates the deposit transaction when the response indicated that the issuer invalidated the check and the deposit transaction.

In an embodiment, at 451, the deposit notifier/validator activates a camera and captures an image of the depositor when the response indicated that the issuer has associated the check with fraudulent activity.

At 460, the deposit notifier/validator resumes the deposit transaction when the response indicated that the issuer validated the check and the deposit transaction.

In an embodiment, at 461, the deposit notifier/validator sends an image of the check and the deposit transaction details to a clearing house when the deposit transaction is a not "on-us" transaction relative to a financial institution associated with the deposit transaction device.

The deposit notifier/validator is processed on a depositing device, which may also be referred to herein and above as a deposit transaction device.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
providing executable instructions to a processor of a deposit transaction device causing the deposit transaction device to perform operations comprising:
detecting a check that is being deposited into a deposit account associated with a depositor during a deposit transaction;
reading a Magnetic Ink Character Recognition (MICR) encoded line of the check by the deposit transaction device by decoding the MICR encoded line and identifying an issuer of the check, a bank associated with the check, and an account number of the issuer with the bank, an amount of the check, and a date of the check
receiving an image captured by the deposit transaction device for the check;
performing image processing on the image of the check to read the MICR encoded line and identify the amount of the check and the date;
suspending the deposit transaction;
requesting, via a network transaction over a network, a rea-time authorization from a notifying service in order to process the check from the issuer of the check during the suspending without exposing information regarding the issuer over the network in the network transaction and while the deposit transaction is being processed on behalf of the depositor at the deposit transaction device, wherein requesting further includes:
hashing issuer information for the issuer into a hash value using a unique hashing algorithm processed on the deposit transaction device;
providing the hash value to the notifying service;
providing the amount of the check to the notifying service;
providing a name of the depositor to the notifying service;
providing the date of the check to the notifying service; and
providing a location associated with the deposit transaction device to the notifying service,
wherein the notifying service searches on the hash value to obtain registered information for the issuer and texts an authorization request to a device of the issuer with the amount of the check, the name of the depositor, and the location of the deposit transaction device;
wherein the notifying service interacts with the issuer via the device of the issuer to obtain deposit authorization on behalf of the depositor while the deposit transaction device has the deposit transaction suspended;
receiving a reply from the notifying service within a set period of time;
terminating the deposit transaction when the reply indicated that the issuer invalidated the check and the deposit transaction;
resuming and completing the deposit transaction by controlling components of the deposit transaction device when the reply indicated that the issuer validated the check and the deposit transaction or when a preference associated with an issuer account of the issuer indicated that authorization to cause the deposit transaction device to process the check is granted when the notifying service is unable to obtain a response from the issuer within the set period of time; and
integrating real-time issuer verification into the deposit transaction by suspending the deposit transaction, employing the unique hashing algorithm to secure issuer information during network transmission, utilizing out-of-band messaging for direct issuer authorization; and applying automated issuer preferences for transaction handling in absence of a real-time authorization.

2. The method of claim 1, wherein requesting further includes providing the image of the check to the notifying service.

3. The method of claim 1, wherein resuming further includes sending the image of the check and deposit transaction details to a clearing house when the deposit transaction is a not on-us transaction relative to a financial institution associated with the deposit transaction device.

4. A system, comprising:
a depositing device comprising a processor and a non-transitory computer-readable storage medium;
the non-transitory computer-readable storage medium comprising depositing device executable instructions;
a notifying server comprising a server processor and a server non-transitory computer-readable storage medium;
the server non-transitory computer-readable storage medium comprising notifying server executable instructions;
the depositing device executable instructions executed by the processor from the non-transitory computer-readable storage medium causing the processor to perform first operations comprising:
suspending a deposit transaction for a deposit;
reading a Magnetic Ink Character Recognition (MICR) encoded line of a check by decoding the MICR encoded line, wherein reading further includes:
receiving an image captured by the depositing device for the check and performing image processing on the image of the check to read the MICR encoded line and identify an amount of the check and a date;

identifying an issuer of the check, a bank associated with the check, and an account number of the issuer with the bank, an amount of the check, and a date of the check;

sending an out-of-band message, via a network transaction over a network, to the notifying server without exposing information regarding the issuer associated with the deposit over the network in the network transaction, wherein sending further includes:

hashing issuer information for the issuer associated with the deposit into a hash value using a unique hashing algorithm providing the hash value to the notifying server;

providing the amount of the check to the notifying server;

providing a name of a depositor for the check to the notifying server;

providing the date of the check to the notifying server; and providing a location associated with the depositing device to the notifying server;

wherein the notifying server searches on the hash value to obtain registered information for the issuer and texts an authorization request to a device of the issuer with the amount of the check, the name of the depositor, and the location of the deposit transaction device;

wherein the notifying server interacts with the issuer via the device of the issuer to obtain deposit authorization on behalf of the depositor while the depositing device has the deposit transaction suspended;

terminating or resuming the deposit transaction based on a response received from the notifying server within a set period of time by controlling components of the depositing device to terminate or resume the deposit transaction; and integrating real-time issuer verification into the deposit transaction by suspending the deposit transaction, employing the unique hashing algorithm to secure issuer information during network transmission, utilizing the out-of-band message for direct issuer authorization; and applying automated issuer preferences for transaction handling in absence of a real-time authorization;

the notifying server executable instructions executed by the notifying server processor from the server non-transitory computer-readable storage medium causing the server processor to perform second operations comprising:

identifying the issuer of the deposit using the identifying information and the hash value;

texting the authorization request to the device of the issuer in real time to obtain the real-time authorization for the deposit from the issuer who authorizes the depositor associated with the deposit to process the deposit transaction at the depositing device during deposit account suspension by the depositing device; and supplying the response to the deposit transaction device based on a reply received from the issuer or based on a preference associated with an issuer account of the issuer indicating that authorization to process the deposit is to be granted when the notifying server executable instructions is unable to obtain the reply from the issuer within the set period of time.

5. The system of claim 4, wherein the deposit transaction device is: an Automated Teller Machine (ATM), a Self-Service Terminal (SST), a Point-Of-Sale (POS) terminal, a tablet device, a phone, or a wearable processing device.

* * * * *

UNITED STATES PATENT AND TRADEMARK OFFICE
CERTIFICATE OF CORRECTION

PATENT NO. : 12,307,429 B2
APPLICATION NO. : 16/456210
DATED : May 20, 2025
INVENTOR(S) : Arun George Eapen It is certified that error appears in the above-identified patent and that said Letters Patent is hereby corrected as shown below:

In the Specification

In Column 2, Line 54, delete "back" and insert --bank-- therefor

In Column 2, Line 57, delete "152)" and insert --151)-- therefor

In Column 2, Line 58, delete "media" and insert --medium-- therefor

In Column 2, Line 58, delete "131, 141," and insert --132, 142,-- therefor

In Column 2, Line 61, delete "152)" and insert --151)-- therefor

In Column 2, Line 62, delete "media" and insert --medium-- therefor

In Column 2, Line 63, delete "131, 141," and insert --132, 142,-- therefor

In Column 2, Line 64, delete "152)" and insert --151)-- therefor

In Column 3, Line 1, delete "receiving" and insert --issuing-- therefor

In Column 4, Line 20, delete "back" and insert --bank-- therefor

In Column 4, Line 57, delete "150." and insert --140.-- therefor

In Column 5, Line 45, delete "media" and insert --medium-- therefor

Signed and Sealed this
Twenty-second Day of July, 2025

Coke Morgan Stewart
*Acting Director of the United States Patent and Trademark Office*

CERTIFICATE OF CORRECTION (continued)
U.S. Pat. No. 12,307,429 B2

In the Claims

In Column 9, Line 45, in Claim 1, after "check", insert --;--

In Column 9, Line 53, in Claim 1, delete "rea-time" and insert --real-time-- therefor